United States Patent Office 2,810,745
Patented Oct. 22, 1957

2,810,745

PURIFYING MAHOGANY SULFONIC ACIDS

John J. Wolski, Springfield, Pa., assignor to Sun Oil Company, Philadelphia, Pa., a corporation of New Jersey No Drawing. Application July 5, 1955,
Serial No. 520,125

9 Claims. (Cl. 260—504)

This invention relates to treating petroleum mahogany sulfonic acids to remove inorganic contaminants.

Mahogany sulfonic acids are produced from petroleum in accordance with procedures involving sulfonation of a mineral oil fraction with strong sulfonating agents such as sulfur trioxide and fuming sulfuric acid. After the sulfonation, the resulting mixture is separated by settling into a lower acid sludge layer which contains most of the excess sulfonating agent and water-soluble green sulfonic acids and an upper sour oil layer containing mahogany sulfonic acids. The sour oil layer is separated by decantation or other suitable means from the green acid layer. Subsequently, refined product mahogany sulfonates are obtained from the sour oil layer after neutralization and solvent extraction steps.

The sour oil layer contains, in addition to oil and mahogany sulfonic acids, minor amounts of inorganic acidic impurities comprising excess sulfonating agent, such as $H_2SO_4$ or $SO_3$, or derivatives thereof such as $SO_2$. These inorganic materials remain dispersed in the mahogany sulfonic acids, and subsequently during neutralization of the mahogany acids the inorganic materials react with the neutralizing agent to form sulfates or sulfites. The presence of inorganic sulfates and/or sulfites in product mahogany sulfonates is undesirable and renders the mahogany sulfonates unsuitable for use in certain applications.

Now, in accordance with the present invention, inorganic impurities such as $H_2SO_4$, $SO_3$, $SO_2$ and the like are removed from the sour oil prior to neutralization of the mahogany sulfonic acids. The sour oil is contacted with an anhydrous alkaline earth metal compound at conditions whereby the alkaline earth metal compound reacts with the inorganic impurities without substantial reaction with the sulfonic acids. It has been found that the inorganic impurities rather than the mahogany acids react with the alkaline earth metal compounds with the formation of solid alkaline earth metal sulfates and/or sulfites. These solid reaction products are separated from the mahogany sulfonic acids and oil by filtration, centrifuging or the like. In this manner, mahogany sulfonic acids are obtained which are substantially completely free from inorganic impurities. These mahogany acids can subsequently be neutralized to form mahogany sulfonate product concentrates which are substantially free of inorganic salts.

The alkaline earth metal compounds used in carrying out the present invention are alkaline earth compounds which react with $H_2SO_4$, $SO_3$ and $SO_2$ to form alkaline earth metal sulfates and sulfites, and which do not form other neutralization products which are difficult to separate from mahogany sulfonic acids or sulfonates or which are deleterious thereto. Compounds of all of the alkaline earth metals can be used. It is preferred to use calcium compounds for reasons of cheapness and availability, but strontium or barium compounds can also be used. The use of alkaline earth oxides or hydroxides is preferred. However, alkaline earth metal carbonates can also be used.

In carrying out the invention, the alkaline earth neutralizing compound in the anhydrous form is added to the sour oil preferably in sufficient amount to react with all the inorganic impurities contained therein to form the corresponding sulfates and sulfites. It is generally preferred to use an approximate stoichiometric quantity of the alkaline earth metal compound to neutralize the inorganic impurities. The addition of substantially less than a stoichiometric quantity of the neutralizing agent results in incomplete neutralization and removal of the inorganic impurities. Amounts of the neutralizing agent in excess of that required to neutralize the inorganic impurities can be employed without substantial sacrifice of the selectivity; however, excessive quantities of the neutralizing agent are unnecessary. Normally, the use of neutralizing agent in amount in the range of 0.8 to 2.0 times the stoichiometric quantity needed to neutralize the acidic impurities is suitable in carrying out the present invention. The stoichiometric quantity of neutralizing compound is readily determined for a particular sour oil by procedures known to a skilled person.

In practicing the invention, the alkaline earth metal neutralizing agent should be added to the sour oil in substantially anhydrous form rather than in admixture with water. It has been found that the selectivity of the neutralizing reaction for the inorganic impurities is adversely affected when the neutralization is carried out in the presence of substantial quantities of water. The minor amount of water normally dispersed in the sour oil layer after separation of the acid sludge layer is not sufficient to materially interfere with the selective neutralization. When an aqueous admixture or solution of the alkaline earth metal neutralizing compound is used, however, mahogany sulfonic acids are neutralized as well as the acidic impurities. For this reason, substantially anhydrous neutralizing agent is employed in carrying out the invention.

The anhydrous alkaline earth metal neutralizing compound is added to the sour oil, and the resulting mixture is agitated to promote the neutralization reaction. Relatively mild temperatures, e. g. temperatures below about 100° F., are preferred for carrying out the selective neutralization of the acidic inorganic impurities. The selective neutralization proceeds satisfactorily at room temperature or at temperatures somewhat lower than room temperature, e. g. 35° F. Elevated temperatures should be avoided since at elevated temperatures the selectivity of the neutralization for acidic impurities is lessened, and substantial amounts of mahogany sulfonic acids may be neutralized along with the acidic impurities. Temperatures up to about 150° F. can on occasion be successfully employed, but it is generally preferable to carry out the selective neutralization at temperatures of less than 100° F.

After the reaction between the acidic impurities and the alkaline earth metal neutralizing agent has occurred, the resulting solid reaction products and any excess neutralizing agent are separated from the mahogany sulfonic acids and oil by filtration or centrifuging or the like. The mahogany sulfonic acids so obtained are substantially completely free of inorganic impurities. The treated mahogany sulfonic acids can be concentrated and neutralized in accordance with known procedures to produce product mahogany sulfonates which are substantially free of inorganic salts.

The following example illustrates the invention:

A petroleum lubricating oil fraction was contacted with anhydrous $SO_3$ at reactive conditions. The resulting reaction mixture was settled, and a sour oil layer containing oil soluble mahogany sulfonic acids, oil and a minor amount of inorganic acidic impurities was separated from a green acid sludge layer.

The sour oil was air-agitated at room temperature, and a stoichiometric quantity of anhydrous $Ca(OH)_2$ to react with the acidic impurities was added to the sour oil. The agitation was continued for about 30 minutes. The resulting mixture was then settled and filtered. The filtrate was neutralized with 50° Bé. NaOH and the resulting sodium mahogany sulfonates were concentrated by extraction with 35% aqueous isopropanol. After removal of the aqueous alcohol by stripping and adjustment of the sulfonate concentration to 62% mahogany sulfonates in oil, the inorganic salt content of the product mahogany sulfonates was 0.12%. This compares to inorganic salt contents of 4.0% to 5.0% of similar mahogany sulfonates not treated in accordance with the present invention.

I claim:

1. The method of removing inorganic acidic impurities from mahogany sulfonic acids which comprises: contacting mahogany sulfonic acids containing inorganic acidic impurities with an anhydrous alkaline earth metal neutralizing agent selected from the group consisting of alkaline earth metal oxides, hydroxides, and carbonates at conditions whereby the acidic impurities selectively react with the neutralizing agent to form solid reaction products, and separating mahogany sulfonic acids having a reduced content of inorganic impurities from the solid products of the neutralization.

2. The method according to claim 1 wherein said neutralizing agent is an alkaline earth metal oxide.

3. The method according to claim 1 wherein said neutralizing agent is an alkaline earth metal hydroxide.

4. The method according to claim 1 wherein said neutralizing agent is an alkaline earth metal carbonate.

5. The method according to claim 1 wherein the neutralization is carried out at a temperature of less than 100° F.

6. The method according to claim 1 wherein the selective neutralization is carried out at room temperature.

7. The method according to claim 1 wherein the alkaline earth metal neutralizing agent is used in amount of 0.8 to 2.0 times the stoichiometric amount to neutralize the acidic impurities.

8. The method according to claim 1 wherein the alkaline earth metal neutralizing agent is used in approximate stoichiometric amount to neutralize the acidic impurities.

9. The method of removing inorganic acidic impurities from mahogany sulfonic acids which comprises: contacting mahogany sulfonic acids containing inorganic acidic impurities with an approximate stoichiometric amount to neutralize the inorganic impurities of an alkaline earth metal compound selected from the group consisting of alkaline earth metal oxides, hydroxides, and carbonates at a temperature less than 100° F., and separating mahogany sulfonic acids substantially free from inorganic impurities from solid neutralization products.

References Cited in the file of this patent

UNITED STATES PATENTS

| | | |
|---|---|---|
| 518,989 | Frasch | May 1, 1894 |
| 1,240,523 | Wolff | Sept. 18, 1917 |
| 1,981,799 | Buc | Nov. 20, 1934 |